US008722560B2

(12) United States Patent
Takamitsu et al.

(10) Patent No.: US 8,722,560 B2
(45) Date of Patent: May 13, 2014

(54) HIGHLY HEAT-RESISTANT β-TYPE ZEOLITE AND SCR CATALYST EMPLOYING THE SAME

(75) Inventors: Yasuyuki Takamitsu, Yamaguchi (JP); Yukio Ito, Yamaguchi (JP)

(73) Assignee: Tosoh Corporation, Yamaguchi (JP)

( * ) Notice: Subject to any disclaimer, the term of this patent is extended or adjusted under 35 U.S.C. 154(b) by 389 days.

(21) Appl. No.: 13/057,577

(22) PCT Filed: Aug. 17, 2009

(86) PCT No.: PCT/JP2009/064411
§ 371 (c)(1),
(2), (4) Date: Feb. 4, 2011

(87) PCT Pub. No.: WO2010/021315
PCT Pub. Date: Feb. 25, 2010

(65) Prior Publication Data
US 2011/0136657 A1       Jun. 9, 2011

(30) Foreign Application Priority Data

Aug. 19, 2008   (JP) ................................. 2008-210938

(51) Int. Cl.
*B01J 29/06*        (2006.01)
*C01B 33/26*        (2006.01)

(52) U.S. Cl.
USPC ................. 502/60; 502/63; 502/74; 423/700; 423/703; 423/705; 977/811

(58) Field of Classification Search
USPC ................ 502/60, 73, 74; 423/700, 703, 705; 977/811
See application file for complete search history.

(56) References Cited

U.S. PATENT DOCUMENTS

| | | | | |
|---|---|---|---|---|
| 3,308,069 | A | * | 3/1967 | Rosinski et al. ................. 502/62 |
| 4,740,292 | A | * | 4/1988 | Chen et al. ................. 208/120.01 |
| 5,171,556 | A | * | 12/1992 | Caullet et al. ................. 423/705 |
| 5,232,579 | A | * | 8/1993 | Absil et al. ..................... 208/113 |
| 5,558,851 | A | * | 9/1996 | Miller ............................ 423/702 |
| 6,331,500 | B1 | * | 12/2001 | Tsuji et al. ....................... 502/63 |
| 6,391,278 | B1 | * | 5/2002 | Pinnavaia et al. ............. 423/718 |
| 7,211,239 | B2 | | 5/2007 | Mueller et al. |
| 7,442,366 | B2 | | 10/2008 | Mueller et al. |
| 7,794,680 | B2 | | 9/2010 | Naraki et al. |
| 2001/0055562 | A1 | * | 12/2001 | Hasenzahl et al. ............ 423/700 |
| 2006/0207917 | A1 | * | 9/2006 | Domokos et al. .......... 208/120.1 |
| 2007/0154388 | A1 | * | 7/2007 | Muller et al. .................. 423/700 |
| 2009/0155152 | A1 | * | 6/2009 | Naraki et al. ................ 423/239.1 |

| | | | |
|---|---|---|---|
| 2010/0003178 | A1 | 1/2010 | Tokunaga et al. |
| 2011/0250127 | A1 | * 10/2011 | Fedeyko et al. ................ 423/700 |
| 2012/0301378 | A1 | * 11/2012 | Fedeyko et al. ............ 423/213.5 |

FOREIGN PATENT DOCUMENTS

| | | |
|---|---|---|
| CN | 101163546 | 4/2008 |
| EP | 0419334 A1 | 3/1991 |
| JP | 63-6487 B2 | 2/1988 |
| JP | 5-201722 A | 8/1993 |
| JP | 9-38485 A | 2/1997 |
| JP | 11-228128 A | 8/1999 |
| JP | 2001-58816 A | 3/2001 |
| JP | 2004-358454 A | 12/2004 |
| JP | 2005-177570 A | 7/2005 |
| JP | 2007-76990 A | 3/2007 |
| JP | 2008-80194 A | 4/2008 |
| JP | 2008-81348 A | 4/2008 |
| JP | 2008-519748 A | 6/2008 |
| JP | 2010-03800 A | 2/2010 |

OTHER PUBLICATIONS

Machine translation of EP 0,419,334, 1991.*
Ding et al. "Effect of particle size on the hydrothermal stability of zeolite beta", Microporous and Mesoporous Materials 101 (2007), pp. 432-439.
Kebing et al., Inner Mongolia University Journal, Nov. 30, 2001, vol. 32, No. 6, pp. 628-633.
Lianhui et al., "Effect of particle size on the hydrothermal stability of zeolite beta", Microporous and Mesoporous Materails, Apr. 20, 2007, vol. 101, pp. 432-439.
China Office action, dated Aug. 31, 2012 along with an english translation thereof.
Office Action for corresponding Chinese Patent Application No. 20090132143.5, mailed on Apr. 2, 2013; and an English translation thereof.
Office Action for corresponding Japanese Patent Application No. 2009-183620, mailed on Oct. 22, 2013; and an English translation thereof.

* cited by examiner

*Primary Examiner* — Elizabeth Wood
(74) *Attorney, Agent, or Firm* — Greenblum & Bernstein, P.L.C.

(57) ABSTRACT

A subject for the invention is to provide a highly heat-resistant SCR catalyst which has an NOx reduction percentage of 40% or higher at 200° C. after a hydrothermal durability treatment. The invention relates to use of β-type zeolite which has an $SiO_2/Al_2O_3$ molar ratio of 20 or higher but less than 30 and a crystallite diameter before a hydrothermal durability treatment of 20 nm or larger, shows a change in crystallite through the hydrothermal durability treatment of less than 10%, and has a fluorine content lower than 0.1%. The β-type zeolite can be crystallized from a liquid reaction mixture containing a secondary and/or a tertiary alkylamine having 5 or more carbon atoms.

10 Claims, 2 Drawing Sheets

HIGHLY HEAT-RESISTANT β-TYPE ZEOLITE AND SCR CATALYST EMPLOYING THE SAME

TECHNICAL FIELD

The present invention provides highly heat-resistant β-type zeolite useful as an adsorbent or catalyst, a process for producing the zeolite, and a use of the zeolite.

BACKGROUND ART

β-Type zeolite is a zeolite having 12-membered-ring micropores and disclosed first in patent document 1, and is in extensive use as adsorbents and catalysts. However, there are the cases where when the zeolite is used at high temperatures, the catalytic performance decreases with collapse of the zeolite crystal structure. There is hence a need for improvement in heat resistance.

Known techniques for improving heat resistance include a method in which the molar ratio of $SiO_2/Al_2O_3$ is heightened (patent document 2), a method in which a zeolite is treated at a high temperature (patent document 3), a method in which the diameter of crystallites is increased (patent documents 4 to 6), and a method in which fluorine is used (patent document 7).

For example, SCR catalysts employing a zeolite (catalysts based on NOx reduction reaction using ammonia as a reducing agent; "SCR" is an abbreviation for "selective catalytic reduction") are required to have high low-temperature activity after a hydrothermal durability treatment, in particular, high activity at 300° C. and lower temperatures (patent document 8). Since SCR catalysts necessitate a large acid amount (low $SiO_2/Al_2O_3$ molar ratio), neither the method in which the molar ratio of $SiO_2/Al_2O_3$ is heightened in order to improve heat resistance nor a high-temperature treatment for inducing aluminum release from the framework can be utilized.

There is hence a desire for a zeolite which has a low $SiO_2/Al_2O_3$ molar ratio and has high heat resistance and high catalytic activity, in particular, β-type zeolite which, when used as an SCR catalyst, shows a high NOx reduction percentage after a hydrothermal durability treatment even at temperatures as low as 200-250° C.

A process for producing β-type zeolite has been disclosed in which a tertiary alkanolamine is added for synthesis besides tetraethylammonium cations to thereby synthesize β-type zeolite having a crystal size as large as 0.1-3 μm (patent document 9). However, the β-type zeolite produced by this method did not have excellent hydrothermal durability.

Also disclosed is a method of synthesizing β-type zeolite in which a structure-directing agent (referred to as SDA) including diethylenetetramine is used (patent document 10). The β-type zeolite obtained by this method had a small primary-crystal diameter, and this zeolite also had insufficient hydrothermal durability.

PRIOR-ART DOCUMENTS

Patent Documents

Patent Document 1: U.S. Pat. No. 3,308,069
Patent Document 2: JP-A-9-38485
Patent Document 3: JP-A-2008-80194
Patent Document 4: JP-A-11-228128
Patent Document 5: JP-B-63-6487
Patent Document 6: JP-A-2001-58816
Patent Document 7: JP-A-2007-76990
Patent Document 8: JP-A-2008-81348
Patent Document 9: JP-A-5-201722
Patent Document 10: JP-T-2008-519748

SUMMARY OF THE INVENTION

Problems that the Invention is to Solve

The invention provides novel β-type zeolite having high adsorption performance and high heat resistance, a process for producing the zeolite, and an SCR catalyst employing the zeolite.

Means for Solving the Problems

The present inventors diligently made investigations in order to overcome the problems described above. As a result, it has been found that when a secondary and/or a tertiary alkyl amine having 5 or more carbon atoms is added to a liquid synthesis reaction mixture besides a structure-directing agent to cause crystallization, then β-type zeolite having a large acid amount, i.e., having an $SiO_2/Al_2O_3$ molar ratio of 20 or higher but less than 30, is obtained, this β-type zeolite having such extremely high heat resistance that the decrease in crystallite diameter through a hydrothermal durability treatment is less than 10%. It has also been found that an SCR catalyst employing such β-type zeolite has high catalytic performance at low temperatures. The invention has been thus completed.

Namely, essential points of the invention reside in the following (1) to (9).

(1) β-Type zeolite which has an $SiO_2/Al_2O_3$ molar ratio of 20 or higher but less than 30 and a crystallite diameter before a hydrothermal durability treatment of 20 nm or larger, shows a change in crystallite diameter through the hydrothermal durability treatment of less than 10%, and has a fluorine content of 0.1% by weight or lower.

(2) The β-type zeolite according to (1), characterized in that the framework $SiO_2/Al_2O_3$ molar ratio before the hydrothermal durability treatment (n) as determined by $^{29}Si$ MAS NMR is 20 or higher but less than 30, and the framework $SiO_2/Al_2O_3$ molar ratio after the hydrothermal durability treatment (n') is not higher by more than 10 than that molar ratio as determined before the hydrothermal durability treatment (n'≤n+10).

(3) The β-type zeolite according to (1) or (2) which has an average particle diameter of 0.35-0.50 μm in an examination with an electron microscope.

(4) A process for producing the β-type zeolite according to any one of (1) to (3), the process comprising crystallizing the zeolite from a liquid reaction mixture containing a secondary and/or a tertiary alkylamine having 5 or more carbon atoms.

(5) An SCR catalyst which comprises the β-type zeolite according to any one of (1) to (3), the zeolite containing at least one metal selected from the elements in Groups 8 to 11 of the periodic table.

(6) The SCR catalyst according to (5) wherein the at least one metal selected from the elements in Groups 8 to 11 of the periodic table comprises iron and/or copper.

(7) The SCR catalyst according to (5) or (6), characterized in that the catalyst contains iron as a metal and that the framework $SiO_2/Al_2O_3$ molar ratio before a hydrothermal durability treatment (m) as determined by $^{29}Si$ MAS NMR is 15-25 and the framework $SiO_2/Al_2O_3$ molar ratio after the hydrothermal durability treatment (m') is higher by more than 10 than that molar ratio as determined before the hydrothermal durability treatment (m'>m+10).

(8) The SCR catalyst according to (7) which contains iron as a metal and in which the framework $SiO_2/Al_2O_3$ molar ratio before the hydrothermal durability treatment (m) as determined by $^{29}Si$ MAS NMR is 15-25 and the framework $SiO_2/Al_2O_3$ molar ratio after the hydrothermal durability treatment (m') is higher than 30 but not higher than 50.

(9) The SCR catalyst according to any one of (5) to (8) which has an NOx reduction percentage of 40% or higher at 200° C. after a hydrothermal durability treatment.

Advantages of the Invention

The β-type zeolite provided by the invention has high heat resistance, has a low $SiO_2/Al_2O_3$ molar ratio, and hence has a large acid amount. When used as an SCR catalyst, this β-type zeolite has excellent hydrothermal durability and has excellent NOx-reducing properties especially at low temperatures.

MODES FOR CARRYING OUT THE INVENTION

Figure 1:
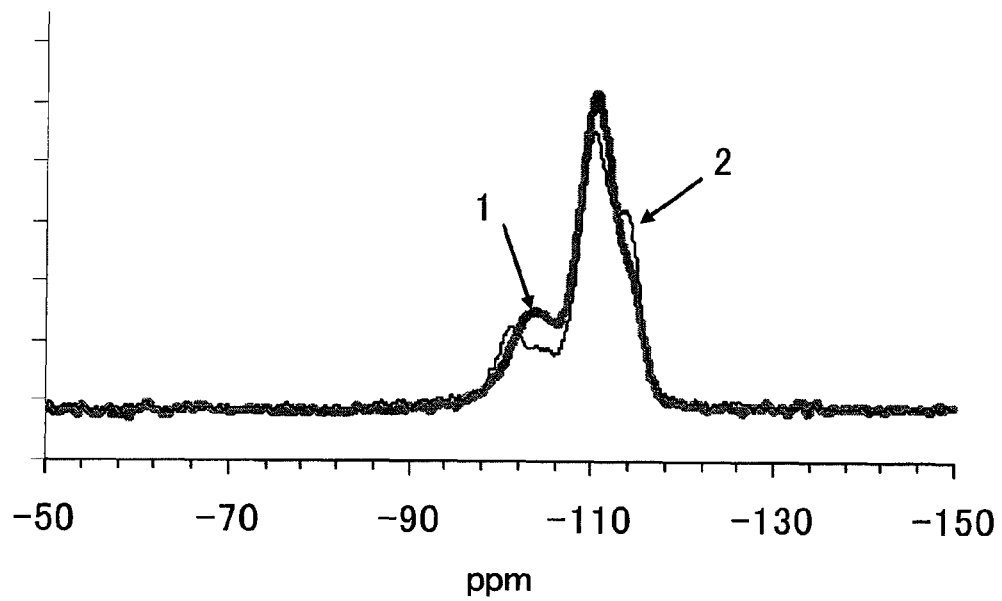
FIG. 1 is a presentation showing $^{29}Si$ MAS NMR spectra of the β-type zeolite obtained in Example 1 on which iron has not been deposited.

The β-type zeolite of the invention has an $SiO_2/Al_2O_3$ molar ratio of 20 or higher but less than 30. In the case where the $SiO_2/Al_2O_3$ molar ratio thereof is lower than 20, the zeolite has insufficient heat resistance. $SiO_2/Al_2O_3$ molar ratios of 30 and higher result in a reduced amount of acid sites necessary for catalytic reactions, although such molar ratios generally bring about enhanced heat resistance. As a result, the SCR catalyst constituted of such a zeolite has reduced catalytic performance.

The term "$SiO_2/Al_2O_3$ molar ratio" in the invention means a ratio which is determined from values of the contents of silicon and aluminum in a sample determined with an ICP (plasma emission spectral analysis) apparatus.

The "average particle diameter in an examination with an electron microscope" in the invention is determined through an examination of a dry powder of a synthesized zeolite with a scanning electron microscope (SEM), the average particle diameter being an average value of the diameters of randomly selected 30 particles. The particle diameter was the Feret diameter measured in a fixed direction.

The β-type zeolite of the invention has a crystallite diameter (after SDA removal by burning) as determined before a hydrothermal durability treatment of 20 nm or larger, and this crystallite diameter is especially preferably 25 nm or larger.

The term "crystallite diameter" in the invention means a value determined from the half-value width of the diffraction line profile for the (302) plane appearing at around 2θ=22.4°, which is a main peak for β-type zeolite, in X-ray powder diffractometry, using Scherrer's equation (I).

$$\text{Crystallite diameter} = K \times \lambda / (\beta_1 \times \cos\theta)$$

$$\beta_2{}^2 = \beta_M{}^2 - \beta_O{}^2$$

$$\beta_1 = \beta_2 \times \pi / 180 \qquad (I)$$

K: constant (0.9)
λ: wavelength of the X-rays (0.15418 nm)
θ: ½ the diffraction angle
$\beta_1$: half-value width (rad) of the peak for (302) crystal plane after apparatus correction
$\beta_2$: half-value width (°) of the peak for (302) crystal plane after apparatus correction
$P_M$: found value (°) of the half-value width of the peak for (302) crystal plane
$\beta_O$: value of apparatus correction (°) determined from $SiO_2$ as a reference Incidentally, the half-value width can be determined by approximating the peak appearing around 2θ=22.4° using the Voight function to conduct waveform separation, subsequently separating the peak into Kα1 and Kα2, and then determining the half-value width from the peak Kα1 through construction (FWHM).

The β-type zeolite of the invention shows a decrease in crystallite diameter through a hydrothermal durability treatment of less than 10%, and this decrease in crystallite diameter is especially preferably 5% or less.

The term "hydrothermal durability treatment" in the invention means a 20-hour heat treatment conducted at 700° C. in a stream of air containing 10% by volume water vapor. The conditions of the hydrothermal durability treatment in the invention are general conditions of hydrothermal durability treatments of zeolites, and are not especially special. At temperatures of 600° C. and higher, thermal damage to not only β-type zeolite but also other zeolites increases exponentially. The hydrothermal durability treatment in the invention corresponds to a treatment conducted at 650° C. for 100-200 hours or more or to a treatment conducted at 800° C. for several hours.

The β-type zeolite of the invention shows a change in crystallite diameter through the hydrothermal durability treatment of as small as less than 10%. This indicates that the crystal structure of the zeolite remains unchanged, and this is thought to bring about the high heat resistance.

The change in crystallite diameter is determined using the following equation.

$$\text{Change in crystallite diameter [\%]} = \{1 - [(\text{crystallite diameter after hydrothermal durability treatment})/(\text{crystallite diameter before hydrothermal durability treatment})]\} \times 100 \qquad (2)$$

The β-type zeolite of the invention has a low fluorine content. In particular, the β-type zeolite preferably is one having a fluorine content of 0.1% by weight or lower, more preferably one containing no fluorine. There are the cases where the β-type zeolite containing fluorine also shows a small change in crystallite diameter through the hydrothermal durability treatment. However, there are the cases where this zeolite, when used as an SCR catalyst, shows poor low-temperature activity although the cause thereof is uncertain.

It is preferred that the β-type zeolite of the invention should satisfy that the framework $SiO_2/Al_2O_3$ molar ratio before the hydrothermal durability treatment (n) as determined by $^{29}Si$ MAS NMR is 20 or higher but less than 30, and that the framework $SiO_2/Al_2O_3$ molar ratio after the hydrothermal durability treatment (n') is not higher by more than 10 than that molar ratio as determined before the hydrothermal durability treatment (n'≤n+10).

An $SiO_2/Al_2O_3$ molar ratio determined through chemical analysis is one obtained while counting the aluminum released from the crystal structure also as a component. In contrast, in $^{29}Si$ MAS NMR, the molar ratio of the $SiO_2$ to $Al_2O_3$ present in the crystal framework can be determined. Consequently, $^{29}Si$ MAS NMR is an effective means for evaluating the heat resistance of zeolites.

When some of the aluminum present in the framework of a zeolite is released from the framework (referred to as dealumination) by a hydrothermal durability treatment, then the framework $SiO_2/Al_2O_3$ molar ratio as determined by $^{29}Si$ MAS NMR increases.

The β-type zeolite of the invention has high heat resistance, and it is preferred that the $SiO_2/Al_2O_3$ molar ratio after the hydrothermal durability treatment (n') as determined by $^{29}Si$ MAS NMR should be not higher by more than 10 than the $SiO_2/Al_2O_3$ molar ratio before the hydrothermal durability treatment (n) (n'≤n+10). It is especially preferred that n' should be not higher than n by more than 7. In the case where the framework $SiO_2/Al_2O_3$ molar ratio of β-type zeolite increases by 10 or more through the hydrothermal durability treatment, this zeolite is apt to deteriorate in the hydrothermal durability treatment due to dealumination.

On the other hand, there are the cases where in β-type zeolite having considerably low heat resistance, dealumination proceeds in a large amount when the structure-directing agent is removed by burning, and the later hydrothermal durability treatment results in only a small change in framework $SiO_2/Al_2O_3$ molar ratio. Such β-type zeolite has a crystallite diameter as determined before the hydrothermal durability treatment of smaller than 20 nm, or has a framework $SiO_2/Al_2O_3$ molar ratio before the hydrothermal durability treatment as determined by $^{29}Si$ MAS NMR of 30 or higher, or shows a change in crystallite diameter through the hydrothermal durability treatment of 10% or more. Namely, such β-type zeolite shows properties different from those of the β-type zeolite of the invention.

The framework $SiO_2/Al_2O_3$ molar ratio as determined by $^{29}Si$ MAS NMR in the invention is a property determined by a general method common to persons skilled in the art. The molar ratio is determined using the following mathematical expression 1 as shown in *Zeoraito No Kagaku To Kogaku* (Kodansha Ltd., published in 2000), page 61.

$$SiO_2/Al_2O_3 = 2 \times \frac{\sum_{n=0}^{4} A_{Si(nAl)}}{\sum_{n=0}^{4} 0.25 n A_{Si(nAl)}} \quad [\text{Math. 1}]$$

A: area of peak in the spectrum

Si(nAl): Si having n Al atoms bonded through oxygen

In the β-type zeolite of the invention, a peak assigned to Si(1Al) (i.e., Si which has Al bonded through oxygen and serves as a solid acid) is observed at around −95 to −105 ppm, and a peak assigned to Si(0Al) (i.e., Si which has no Al bonded through oxygen and does not serve as a solid acid) is observed at around −105 to −120 ppm; the framework $SiO_2/Al_2O_3$ molar ratio is determined from the two peaks. No peak for n=2 to 4 is observed.

The process for producing the β-type zeolite of the invention is explained next.

Basically, β-type zeolite can be produced by conducting hydrothermal synthesis in the presence of a silica source, an aluminum source, an alkali, a structure-directing agent (SDA), and water. For example, the zeolite can be produced in accordance with the method described in JP-A-6-287015. Examples of the ranges of starting-material proportions for the β-type zeolite of the invention include the following.

$SiO_2/Al_2O_3$ molar ratio, 20-40

Alkali/$SiO_2$ molar ratio, 0-1

$H_2O/SiO_2$ molar ratio, 7-15

SDA/$SiO_2$ molar ratio, 0.05-0.3

(Secondary/tertiary alkylamine having 5 or more carbon atoms)/$SiO_2$ molar ratio, 0.01-1.0

Production of the β-type zeolite of the invention differs from conventional production in that use is made of a secondary and/or a tertiary alkylamine having 5 or more carbon atoms.

As the secondary and/or tertiary alkylamine having 5 or more carbon atoms, use can be made of an ethyleneamine derivative such as triethylenetetramine, tetraethylenepentamine, pentaethylenehexamine, or N-(2-ethylamino)piperazine or a tertiary-amine catalyst manufactured by Tosoh Corp. (trade name, TOYOCAT). Usable examples of the TOYOCAT include TOYOCAT-HPW (methylhydroxyethylpiperazine), TOYOCAT-ET (bis(dimethylaminoethyl)ether), TOYOCAT-DT (pentamethyldiethylenetriamine), TOYOCAT-NP (trimethylaminoethylpiperazine), and TOYOCAT-TE (tetramethylethylenediamine).

In the invention, by using the secondary and/or tertiary alkylamine having 5 or more carbon atoms, β-type zeolite having exceedingly high heat resistance and having a larger crystallite diameter than that produced without adding the amine is obtained. Specifically, the β-type zeolite has a crystallite diameter of 50 nm or larger after drying and has a crystallite diameter of 20 nm or larger after burning for SDA removal and before a hydrothermal durability treatment. In particular, the crystallite diameter thereof after drying is preferably 70 nm or larger.

In the case where a secondary and/or a tertiary alkylamine having 4 or less carbon atoms, such as diethylenetriamine, is used, the resultant zeolite has a smaller crystallite diameter and shows reduced catalytic activity after a hydrothermal durability treatment.

In the production process of the invention, it is preferred that no fluorine-containing compound should be used, for the reason given above.

As the silica source as a starting material, use can be made of an aqueous sodium silicate solution, precipitated silica, colloidal silica, fumed silica, aluminosilicate gel, and silicon alkoxide such as tetraethoxysilane.

The state of the aluminum source as a starting material is not particularly limited, and may be any state selected from elemental metal, aqueous solution, oxide, hydroxide, chloride, nitrate, sulfate, etc.

As the structure-directing agent (SDA), use can be made of a compound having a tetraethylammonium cation, such as tetraethylammonium hydroxide, tetraethylammonium chloride, or tetraethylammonium bromide. Other examples thereof include octamethylenebisquinuclidin, α,α'-diquinuclidinyl-p-xylene, α,α'-diquinuclidinyl-m-xylene, α,α'-diquinuclidinyl-o-xylene, 1,4-diazabicyclo-[2,2,2]octane, and 1,3,3,N,N-pentamethyl-6-azonium bicyclo[3,2,1]octane or N,N-diethyl-1,3,3-trimethyl-6-azonium bicyclo[3,2,1]octane cation. It is especially preferred to use an aqueous solution of tetraethylammonium hydroxide.

A starting-material mixture having the composition shown above is crystallized in a closed pressure vessel at any desired temperature of 100-180° C. over a sufficiently prolonged time period. Thus, the β-type zeolite according to this invention can be obtained. After completion of the crystallization, the reaction mixture is allowed to cool sufficiently and subjected to solid-liquid separation. The solid is washed with a sufficient amount of pure water and dried at any desired temperature of 100-150° C. Thereafter, the dried solid is burned at any desired temperature of 400-650° C. for 1-10 hours to remove the SDA. Thus, the β-type zeolite according to the invention can be obtained.

By depositing an active metal such as iron or copper to the β-type zeolite of the invention, this zeolite can be rendered usable as an SCR catalyst which exhibits NOx-decomposing performance.

The SCR catalyst of the invention preferably is one which includes the β-type zeolite of the invention described above that contains iron as a metal and in which the framework $SiO_2/Al_2O_3$ molar ratio before a hydrothermal durability treatment (m) as determined by $^{29}Si$ MAS NMR is 15-25 and the framework $SiO_2/Al_2O_3$ molar ratio after the hydrothermal durability treatment (m') is higher by more than 10 than that molar ratio as determined before the hydrothermal durability treatment.

Although the β-type zeolite of the invention has a framework $SiO_2/Al_2O_3$ molar ratio (n) as determined by $^{29}Si$ MAS NMR of 20 or higher but less than 30 (before hydrothermal durability treatment), deposition of a metal thereon results in a decrease in the NMR-determined molar ratio by 1-10 (before hydrothermal durability treatment) from the value determined before the deposition. For example, deposition of iron in an amount of several percents by weight results in a decrease by about 4-5. Consequently, the framework $SiO_2/Al_2O_3$ molar ratio (m) of this SCR catalyst of the invention is preferably 15-25 (before the deposition, the molar ratio is 20 or higher but less than 30). The phenomenon in which the framework $SiO_2/Al_2O_3$ molar ratio as determined by $^{29}Si$ MAS NMR is thus reduced by the deposition of iron is the result of an overall decrease in silicon peak intensity caused by the influence of Si/Fe spin interaction, and occurs irrespective of the heat resistance of the β-type zeolite.

Next, with respect to the SCR catalyst obtained by depositing iron on the β-type zeolite, the framework $SiO_2/Al_2O_3$ molar ratio after a hydrothermal durability treatment (m') as determined by $^{29}Si$ MAS NMR is higher than the molar ratio before the hydrothermal durability treatment (m). However, this tendency differs from the tendency of the β-type zeolite itself. Namely, in the SCR catalyst on which iron has been deposited, the higher the hydrothermal durability, the more the framework $SiO_2/Al_2O_3$ molar ratio as determined by $^{29}Si$ MAS NMR increases through a hydrothermal durability treatment. In particular, it is preferred that the molar ratio after the hydrothermal durability treatment (m') should be higher than the molar ratio before the hydrothermal durability treatment (m) by more than 10 (m'>m+10), especially by more than 15 (m'>m+15).

Although the cause of such a phenomenon has not been fully elucidated, the following explanation is given.

As stated above, the presence of iron reduces the area of the silicon peak obtained by $^{29}Si$ MAS NMR. However, the fact that the intensity of spin interaction is inversely proportional to the interatomic distance indicates that the larger the decrease in peak area in the catalyst containing iron, the shorter the Fe-to-Si distance. In the case where a hydrothermal durability treatment results in aggregation of iron (a decrease in catalytic activity), the NMR absorption spectrum of Si which presents near to such iron is enlarged. Incidentally, SCR reactions proceed by the action of both acid sites and the metal and, hence, metal atoms which adjoin acid sites mainly contribute to catalytic activity. Namely, the active iron species is present in the vicinity of not Si(0Al) but Si(1Al).

In the SCR catalyst of the invention, which has excellent hydrothermal durability, the aggregation of iron is less apt to occur around Si(1Al) (namely, unaggregated iron, which contributes to catalytic activity, is present in a large amount around Si(1Al) even after a hydrothermal durability treatment) and occurs only around Si(0Al). Because of this, a hydrothermal durability treatment results in an increase in the area of the peak for Si(0Al) alone in expression (1) and a relative decrease in the area of the peak for Si(1Al).

When there is no metal which influences NMR spectrum, a change in the framework $SiO_2/Al_2O_3$ molar ratio as determined by NMR can be an index to whether dealumination has occurred or not. However, when a metal (in particular, iron) which influences an NMR absorption spectrum is present, a change in the framework $SiO_2/Al_2O_3$ molar ratio as determined by NMR can be an index to the state (aggregated or unaggregated state) of iron present in the vicinity of Si(1Al), which influences catalytic activity, as described above.

Consequently, the SCR catalyst of the invention preferably is one which contains iron as a metal and in which the framework $SiO_2/Al_2O_3$ molar ratio before the hydrothermal durability treatment (m) as determined by $^{29}Si$ MAS NMR is 15-25 and the framework $SiO_2/Al_2O_3$ molar ratio after the hydrothermal durability treatment (m') is higher than 30 but not higher than 50, and is especially 35 or higher.

The β-type zeolite of the invention can be used as an SCR catalyst which has an NOx reduction percentage of 40% or higher at 200° C. after a hydrothermal durability treatment.

The NOx (nitrogen oxides) reduction percentage of an SCR catalyst in the invention is defined as the NOx removal efficiency determined when a raw gas composed of a 1:1 gaseous mixture of nitrogen monoxide and ammonia (200 ppm each), 10 vol % oxygen, and nitrogen gas as the remainder is brought into contact with the catalyst at a rate of 1.5 L/min in a raw gas/catalyst volume ratio of 1,000/min. The NOx reduction conditions in the invention are within the range of general conditions usually used for evaluating the NOx-reducing properties of SCR catalysts, and are not especially special.

The SCR catalyst of the invention is a catalyst obtained by depositing on the β-type zeolite at least one metal selected from the elements in Groups 8 to 11 of the periodic table, i.e., iron, cobalt, nickel, copper, ruthenium, rhodium, palladium, silver, osmium, iridium, platinum, and gold. The catalyst preferably is one obtained by depositing one or more members selected from the group consisting of iron, cobalt, palladium, iridium, platinum, copper, silver, and gold, and more preferably is one obtained by depositing iron and/or copper. It is possible to additionally add a promoter ingredient such as a rare-earth metal, titanium, or zirconium.

Methods for depositing the active-metal species are not particularly limited, and use can be made of an ion-exchange method, impregnation deposition method, evaporation-to-dryness method, precipitation deposition method, physical mixing method, or the like. With respect to starting materials for the metal deposition, any of soluble or insoluble materials can be used, such as nitrates, sulfates, acetates, chlorides, complex salts, oxides, and composite oxides.

The amount of the metal to be deposited is not limited. However, the amount thereof is preferably in the range of 0.1-10% by weight, especially 1-7%.

The SCR catalyst of the invention can be used after having been mixed with silica, alumina, and a binder, e.g., a clay mineral, and molded. Examples of the clay mineral to be used for the molding include kaolin, attapulgite, montmorillonite, bentonite, allophane, and sepiolite.

With the SCR catalyst of the invention, discharge gas containing nitrogen oxides can be cleaned by bringing the discharge gas into contact with the catalyst.

Examples of the nitrogen oxides which are removed according to the invention include nitrogen monoxide, nitrogen dioxide, dinitrogen trioxide, dinitrogen tetroxide, dinitrogen monoxide, and mixtures thereof. Preferred are nitrogen monoxide, nitrogen dioxide, and dinitrogen monoxide. The nitrogen oxide concentrations of discharge gases which can be treated by the invention are not limited.

The discharge gas may contain components other than nitrogen oxides. For example, the discharge gas may contain hydrocarbons, carbon monoxide, carbon dioxide, hydrogen, nitrogen, oxygen, sulfur oxides, and water. Specifically, with the catalyst of the invention, nitrogen oxides can be removed from various kinds of discharge gases such as exhaust gases from diesel-powered motor vehicles and gasoline-powered motor vehicles and discharge gases from boilers and gas turbines.

The SCR catalyst of the invention serves to remove nitrogen oxides in the presence of a reducing agent.

As a reducing agent, use can be made of the hydrocarbons, carbon monoxide, hydrogen, and the like contained in the discharge gas. Furthermore, an appropriate reducing agent may be added to the discharge gas and caused to coexist therewith. The reducing agent to be added to the discharge gas is not particularly limited, and examples thereof include ammonia, urea, organic amines, hydrocarbons, alcohols, ketones, carbon monoxide, and hydrogen. Especially for the purpose of further heightening the efficiency of nitrogen oxide removal, use is especially made of ammonia, urea, or an organic amine.

Methods for adding these reducing agents are not particularly limited, and use can be made of, for example, a method in which a reducing ingredient in a gaseous state is directly added, a method in which a reducing ingredient in a liquid state such as an aqueous solution is sprayed and vaporized, or a method in which a reducing ingredient is sprayed and pyrolyzed. The amount of those reducing agents to be added can be set at will so that nitrogen oxides can be sufficiently removed.

In the method of nitrogen oxide removal with the catalyst of the invention, the space velocity at which the SCR catalyst is contacted with the discharge gas is not particularly limited. However, the space velocity is preferably 500-500,000 $hr^{-1}$, more preferably 2,000-300,000 $hr^{-1}$, on a volume basis.

EXAMPLES

The invention will be explained below by reference to Examples, but the invention should not be construed as being limited to the Examples.

<Conditions of Hydrothermal Durability Treatment>
Temperature: 700° C.
Period: 20 hours
Moisture concentration in gas: 10% by volume
Gas flow rate/zeolite volume ratio: 100 times/min
<Conditions of Examination with X-Ray Diffraction Apparatus>
Apparatus: MXP3VII, manufactured by MAC Science Co., Ltd.
X-ray source: CuKα=1.5405 Å
Accelerating voltage: 40 kV
Tube current: 30 mA
Scanning rate: 2θ=0.02 deg/sec
Sampling interval: 0.02 deg
Divergence slit: 1 deg
Scattering slit: 1 deg
Receiving slit: 0.3 mm
Monochromator was used
Goniometer radius: 185 mm
<Conditions of $^{29}$Si MAS NMR Examination>
Apparatus: Varian NMRS-400
Pretreatment: overnight hydration treatment at relative humidity of 80%
Resonance frequency: 79.4 MHz
Pulse duration: π/6
Waiting time: 10 sec
Number of integrations: 1,500
Rotational frequency: 10.0 kHz
Reference for shift: TMS
It is thought that peak intensity changes with iron content. In order to avoid comparisons made under different conditions, the content of iron in $^{29}$Si MAS NMR is set at 2-3 wt %.
<Conditions of Evaluation of NOx Reduction by SCR Catalyst>
Composition of raw gas: NO, 200 ppm
$NH_3$, 200 ppm
$O_2$, 10 vol %
$H_2O$, 3 vol %
Remainder, nitrogen balance
Flow rate of raw gas, 1.5 L/min
Raw gas/catalyst volume ratio, 1,000/min

Example 1

Tetraethyl orthosilicate, aluminum isopropoxide, an aqueous tetraethylammonium hydroxide (hereinafter referred to as TEAOH) solution, and an amine (pentamethyldiethylenetriamine; TOYOCAT-DT, manufactured by Tosoh Corp.) were mixed together, and the mixture was stirred at room temperature to thereby vaporize ethanol. Water and seed crystals (HSZ930NHA, manufactured by Tosoh Corp.) were added thereto to regulate the reaction mixture so as to have a composition composed of $SiO_2$:0.034$Al_2O_3$:0.16TEAOH: 0.3 the amine:10$H_2O$. This reaction mixture was placed in a sealed autoclave made of stainless steel, and was heated at 150° C. with stirring to cause crystallization. The slurry mixture resulting from the crystallization was subjected to solid-liquid separation, and the solid was washed with a sufficient amount of pure water and dried at 110° C. The dry powder was burned at 600° C. for 2 hours to obtain β-type zeolite.

Example 2

A powder of amorphous silica (product name, Nipsil VM-3; manufactured by Tosoh Silica Corp.), aluminum hydroxide, an aqueous TEAOH solution, an aqueous sodium hydroxide solution, an amine (bis(dimethylaminoethyl)ether; TOYOCAT-ET, manufactured by Tosoh Corp.), water, and seed crystals (β-type zeolite manufactured by Tosoh Corp.; product name, HSZ930NHA) were added together and sufficiently stirred and mixed. This reaction mixture had a molar composition composed of $SiO_2$:0.03$Al_2O_3$:0.20TEAOH: 0.05NaOH:0.3 the amine:10$H_2O$. This reaction mixture was placed in a sealed autoclave made of stainless steel, and was heated at 150° C. with stirring to cause crystallization. The slurry mixture resulting from the crystallization was subjected to solid-liquid separation, and the solid was washed with a sufficient amount of pure water and dried at 110° C. The dry powder was burned at 550° C. for 2 hours to obtain β-type zeolite.

Example 3

An aqueous sodium silicate solution was mixed with an aqueous aluminum sulfate solution to obtain a particulate amorphous aluminosilicate. The amorphous aluminosilicate, an aqueous TEAOH solution, an aqueous sodium hydroxide solution, an amine (tetraethylenepentamine), water, and seed crystals (β-type zeolite manufactured by Tosoh Corp.; product name, HSZ930NHA) were added together and sufficiently stirred and mixed. This reaction mixture had a molar composition composed of $SiO_2$:0.03$Al_2O_3$:0.20TEAOH: 0.05NaOH:0.3 the amine:10$H_2O$. This reaction mixture was placed in a sealed autoclave made of stainless steel, and was heated at 150° C. with stirring to cause crystallization. The slurry mixture resulting from the crystallization was subjected to solid-liquid separation, and the solid was washed with a sufficient amount of pure water and dried at 110° C. The dry powder was burned at 550° C. for 2 hours to obtain β-type zeolite.

Example 4

An aqueous sodium silicate solution was mixed with an aqueous aluminum sulfate solution to obtain a particulate amorphous aluminosilicate. The amorphous aluminosilicate, an aqueous TEAOH solution, an aqueous potassium hydroxide solution, an amine (triethylenetetramine), water, and seed crystals (β-type zeolite manufactured by Tosoh Corp.; product name, HSZ930NHA) were added together and sufficiently stirred and mixed. This reaction mixture had a molar composition composed of $SiO_2$:0.03$Al_2O_3$:0.14TEAOH: 0.05KOH:0.3 the amine:10$H_2O$. This reaction mixture was placed in a sealed autoclave made of stainless steel, and was heated at 150° C. with stirring to cause crystallization. The slurry mixture resulting from the crystallization was subjected to solid-liquid separation, and the solid was washed with a sufficient amount of pure water and dried at 110° C. The dry powder was burned at 550° C. for 2 hours to obtain β-type zeolite.

Comparative Example 1

In accordance with the Example 1 of JP-A-2008-81348, an aqueous sodium silicate solution and an aqueous aluminum sulfate solution were used to obtain a particulate amorphous aluminosilicate. Subsequently, this aluminosilicate was mixed so as to result in a reaction mixture having a composition composed of $SiO_2$:0.05$Al_2O_3$:0.67TEAF:11$H_2O$. Furthermore, 0.36 parts of seed crystals (β-type zeolite manufactured by Tosoh Corp.; trade name, HSZ940NHA) were added per 100 parts of the composition. The resultant mixture was heated at 155° C. in an autoclave with stirring to cause crystallization. The slurry resulting from the crystallization was washed and dried at 110° C. (TEAF: tetraethyl ammonium fluoride) The dry powder was burned at 600° C. for 2 hours to obtain β-type zeolite. This zeolite had a fluorine content of 0.17%.

Comparative Example 2

In accordance with the Example 3 of JP-A-2008-81348, an aqueous sodium silicate solution and an aqueous aluminum sulfate solution were used to obtain a particulate amorphous aluminosilicate. The same treatment as in Comparative Example 1 was conducted, except that the reaction-mixture composition was changed so as to be composed of $SiO_2$: 0.034$Al_2O_3$:0.30TEAOH:0.10KOH:9.9$H_2O$, and that the synthesis temperature was changed to 150° C. and HSZ930NHA, manufactured by Tosoh Corp., was used as seed crystals.

Comparative Example 3

In accordance with the Example 5 of JP-A-2008-81348, an aqueous sodium silicate solution and an aqueous aluminum sulfate solution were used to obtain a particulate amorphous aluminosilicate. The same treatment as in Comparative Example 1 was conducted, except that the reaction-mixture composition was changed so as to be composed of $SiO_2$: 0.034$Al_2O_3$:0.07TEABr:0.13TEAOH:9.9$H_2O$, and that the synthesis temperature was changed to 150° C. and HSZ930NHA, manufactured by Tosoh Corp., was used as seed crystals (TEABr: tetraethylammonium bromide).

Comparative Example 4

In accordance with the Example 7 of JP-A-2008-81348, tetraethyl orthosilicate was mixed with aluminum isopropoxide and TEAOH, and the mixture was stirred at room temperature to thereby vaporize ethanol. Water and seed crystals were added thereto to regulate the reaction mixture so as to have a composition composed of $SiO_2$:0.034$Al_2O_3$: 0.16TEAOH:10$H_2O$. The same treatment as in Comparative example 1 was conducted, except that the synthesis temperature was changed to 150° C. and HSZ930NHA, manufactured by Tosoh Corp., was used as the seed crystals.

Comparative Example 5

Tetraethyl orthosilicate, aluminum isopropoxide, an aqueous TEAOH solution, and an amine (triethanolamine) were mixed together, and the mixture was stirred at room temperature to thereby vaporize ethanol. Water and seed crystals (HSZ930NHA, manufactured by Tosoh Corp.) were added thereto to regulate the reaction mixture so as to have a composition composed of $SiO_2$:0.034$Al_2O_3$:0.16TEAOH:0.3 the amine:10$H_2O$. This reaction mixture was placed in a sealed autoclave made of stainless steel, and was heated at 150° C. with stirring to cause crystallization. The slurry mixture resulting from the crystallization was subjected to solid-liquid separation, and the solid was washed with a sufficient amount of pure water and dried at 110° C. The dry powder was burned at 600° C. for 2 hours to obtain β-type zeolite.

Comparative Example 6

Tetraethyl orthosilicate, aluminum isopropoxide, an aqueous TEAOH solution, and an amine (diethylenetriamine) were mixed together, and the mixture was stirred at room temperature to thereby vaporize ethanol. Water and seed crystals (HSZ930NHA, manufactured by Tosoh Corp.) were added thereto to regulate the reaction mixture so as to have a composition composed of $SiO_2$:0.034$Al_2O_3$:0.16TEAOH: 0.3 the amine:10$H_2O$. This reaction mixture was placed in a sealed autoclave made of stainless steel, and was heated at 150° C. with stirring to cause crystallization. The slurry mixture resulting from the crystallization was subjected to solid-liquid separation, and the solid was washed with a sufficient amount of pure water and dried at 110° C. The dry powder was burned at 600° C. for 2 hours to obtain β-type zeolite.

Comparative Example 7

In accordance with the Example 6 of U.S. Pat. No. 3,308,069, use was made of $NaAlO_2$, water, a powder of amorphous silica (product name, Nipsil VM-3; manufactured by Tosoh Silica Corp.), and an aqueous TEAOH solution, and no seed crystals were used. The reaction mixture had a composition composed of $SiO_2:0.025Al_2O_3:0.62TEAOH:0.1NaOH:20H_2O$. This reaction mixture was placed in a sealed autoclave made of stainless steel, and was heated at 150° C. with stirring to cause crystallization. The slurry mixture resulting from the crystallization was subjected to solid-liquid separation, and the solid was washed with a sufficient amount of pure water and dried at 110° C. The dry powder was burned at 600° C. for 2 hours to obtain β-type zeolite.

Comparative Example 8

The same treatment as in Comparative Example 7 was conducted, except that the reaction-mixture composition was changed so as to be composed of $SiO_2:0.02Al_2O_3:0.62TEAOH:0.1NaOH:20H_2O$.

(Deposition of Iron)

An aqueous solution of $Fe(NO_3)_3 \cdot 9H_2O$ was used to deposit 3% by weight iron metal on each of the β-type zeolite products obtained in the Examples and Comparative Examples, and these zeolite products were burned at 500° C. in air.

The $SiO_2/Al_2O_3$ molar ratio, crystallite diameter, average particle diameter determined through an examination with an electron microscope, and framework $SiO_2/Al_2O_3$ molar ratio determined by $^{29}$Si MAS NMR of each of the β-type zeolite products obtained in the Examples and Comparative Examples are shown in Table 1. The property values for dry products are ones determined after 110° C. drying, and the property values for "before hydrothermal durability treatment" are ones obtained after burning.

Figure 2:
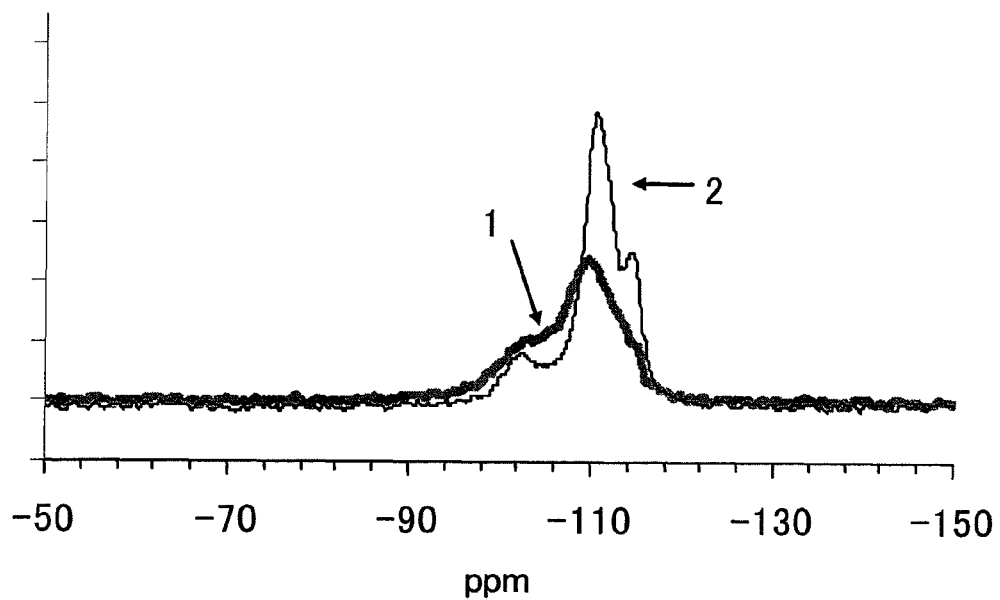
FIG. 2 is a presentation showing $^{29}Si$ MAS NMR spectra of the β-type zeolite obtained in Example 1 on which iron has been deposited.

$^{29}$Si MAS NMR spectra of the β-type zeolite obtained in Example 1 on which iron has not been deposited are shown in FIG. 1, and $^{29}$Si MAS NMR spectra of the β-type zeolite on which iron has been deposited are shown in FIG. 2.

Figure 3:
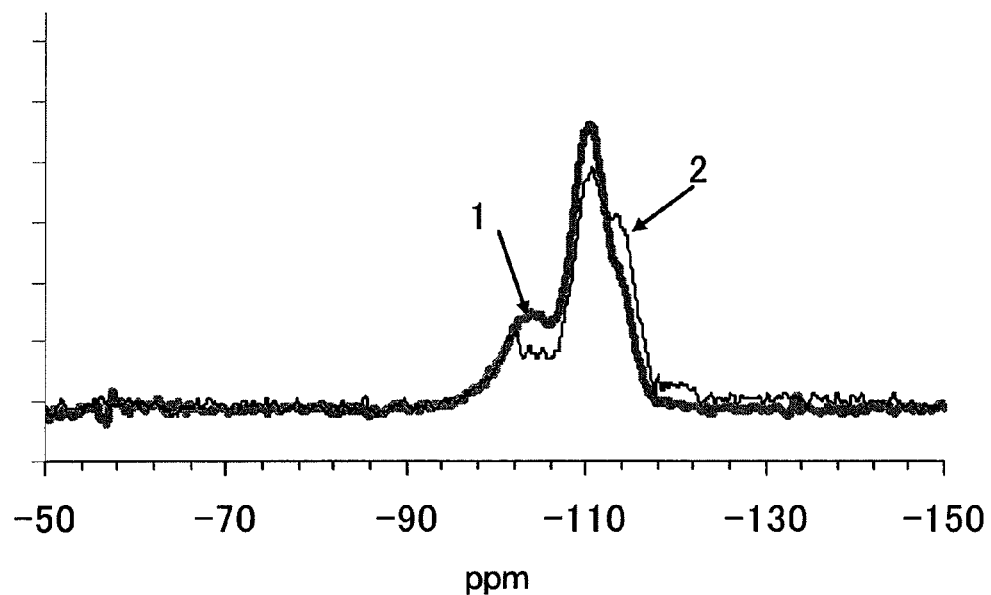
FIG. 3 is a presentation showing $^{29}Si$ MAS NMR spectra of the β-type zeolite obtained in Comparative Example 2 on which iron has not been deposited.
Figure 4:
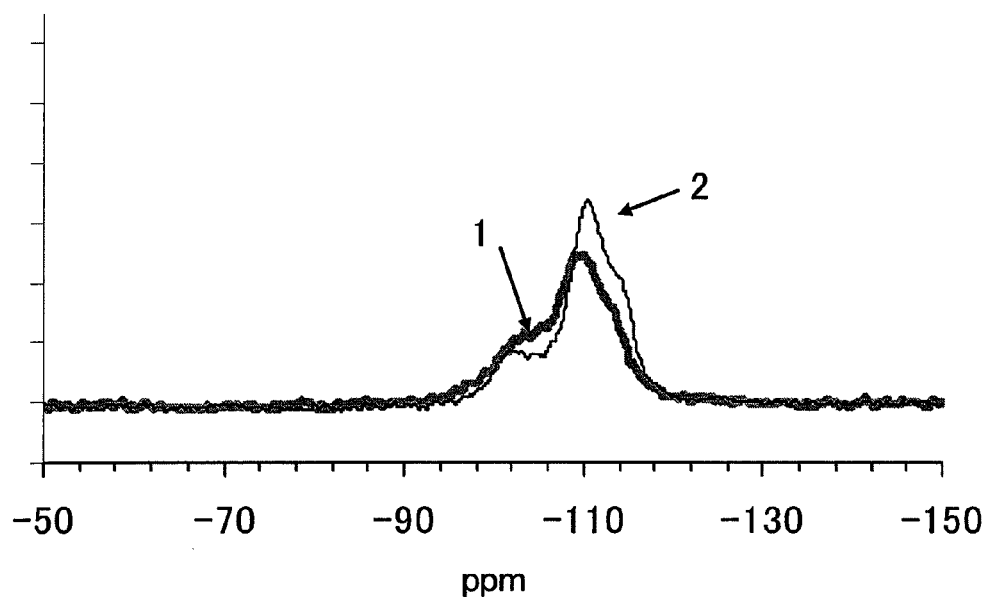
FIG. 4 is a presentation showing $^{29}Si$ MAS NMR spectra of the β-type zeolite obtained in Comparative Example 2 on which iron has been deposited.

For the purpose of comparison, $^{29}$Si MAS NMR spectra of the β-type zeolite obtained in Comparative Example 2 on which iron has not been deposited are shown in FIG. 3, and $^{29}$Si MAS NMR spectra of the β-type zeolite on which iron has been deposited are shown in FIG. 4.

In each figure, reference numeral 1 denotes the $^{29}$Si MAS NMR spectrum obtained before a hydrothermal durability treatment, while reference numeral 2 denotes the $^{29}$Si MAS NMR spectrum obtained after the hydrothermal durability treatment. Incidentally, the scale of the ordinate is the same throughout FIGS. 1 to 4.

Although the framework $SiO_2/Al_2O_3$ molar ratios as determined by $^{29}$Si MAS NMR are as shown in Table 1, a closer examination of the $^{29}$Si MAS NMR spectra reveals the following. The relative values of the area of the peak for Si(1Al) [(before iron deposition):(after iron deposition)] are 10:7 in Example 1 and 10:8 in Comparative Example 2, before the hydrothermal durability treatment. In contrast, after the hydrothermal durability treatment, the relative values thereof are 10:7 in Example 1 and 10:10 in Comparative Example 2. This is thought to be because iron remains in the vicinity of Si(1Al) in the Example as stated hereinabove. On the other hand, the relative values of the area of the peak for Si(0Al) [(before iron deposition):(after iron deposition)] are 10:5 in Example 1 and 10:6 in Comparative Example 2, before the hydrothermal durability treatment. In contrast, after the hydrothermal durability treatment, the relative values thereof are 10:9 in Example 1 and 10:8 in Comparative Example 2. Although a recovery of peak area which is thought to have accompanied aggregation of iron is observed in each catalyst, this is a tendency reverse to that for the Si(1Al) peak area. Namely, it can be understood that iron aggregation in the vicinity of Si(0Al) proceeded to a higher degree in Example 1. The reason why iron aggregation is not inhibited throughout the whole catalyst but is selectively inhibited only in the vicinity of Si(1Al) has not been elucidated. However, since metal atoms adjoining acid sites are thought to mainly contribute to the activity of the SCR catalyst, it can be understood that the β-type zeolite of Example 1, in which iron aggregation in the vicinity of Si(1Al) had been inhibited, showed higher catalytic performance.

(Evaluation of SCR Catalyst Performance)

The SCR catalysts obtained by depositing 3% by weight iron metal on the β-type zeolite products were subjected to a hydrothermal durability treatment and then evaluated. The results thereof are shown in Table 2.

The SCR catalysts obtained using the β-type zeolite products of the invention showed higher NOx-reducing performance after the hydrothermal durability treatment than the cases using the β-type zeolite products of the Comparative Examples.

TABLE 1

| | $SiO_2/Al_2O_3$ molar ratio [—] | Average particle diameter, electron microscope [μm] | Crystallite diameter of dry product [nm] | Crystallite diameter[1] [nm/nm] | Change in crystallite diameter [%] | Framework $SiO_2/Al_2O_3$[2] before iron deposition [—/—] | Framework $SiO_2/Al_2O_3$[2] after iron deposition [—/—] |
|---|---|---|---|---|---|---|---|
| Example 1 | 29 | 0.40 | 76 | 25.1/23.1 | 8 | 25/31 | 21/38 |
| Example 2 | 27 | 0.39 | 72 | 22.2/20.3 | 9 | | |
| Example 3 | 27 | 0.41 | 82 | 21.1/20.1 | 5 | 24/30 | 19/38 |
| Example 4 | 29 | 0.46 | 88 | 22.7/20.6 | 9 | 25/31 | 20/36 |
| Comparative Example 1 | 24 | 0.78 | 61 | 27.8/26.3 | 5 | 29/34 | 20/30 |
| Comparative Example 2 | 24 | 0.52 | 38 | 19.9/15.7 | 21 | 22/31 | 18/27 |
| Comparative Example 3 | 29 | 0.40 | 33 | 21.1/18.1 | 14 | | |
| Comparative Example 4 | 29 | 0.44 | 32 | 23.1/20.1 | 13 | | |
| Comparative Example 5 | 29 | 0.32 | 60 | 25.1/21.6 | 14 | 24/34 | 20/29 |
| Comparative Example 6 | 29 | 0.27 | 24 | 19.1/15.1 | 21 | 24/33 | 21/30 |
| Comparative Example 7 | 30 | 0.10 | 18 | 12.7/12.2 | 4 | 28/32 | 20/24 |

TABLE 1-continued

| | SiO$_2$/Al$_2$O$_3$ molar ratio [—] | Average particle diameter, electron microscope [μm] | Crystallite diameter of dry product [nm] | Crystallite diameter[1] [nm/nm] | Change in crystallite diameter [%] | Framework SiO$_2$/Al$_2$O$_3$[2] before iron deposition [—/—] | Framework SiO$_2$/Al$_2$O$_3$[2] after iron deposition [—/—] |
|---|---|---|---|---|---|---|---|
| Comparative Example 8 | 41 | 0.30 | 53 | 22.0/21.8 | 1 | 34/41 | 30/35 |

[1]Crystallite diameter: (value before hydrothermal durability treatment)/(value after hydrothermal durability treatment)
[2]Framework SiO$_2$/Al$_2$O$_3$: framework SiO$_2$/Al$_2$O$_3$ molar ratio determining by $^{29}$Si MAS NMR. (value before hydrothermal durability treatment)/(value after hydrothermal durability treatment)

TABLE 2

Performance of SCR catalyst after hydrothermal durability treatment
3% Fe deposited; NOx reduction percentage [%]

| | 200° C. | 250° C. |
|---|---|---|
| Example 1 | 45 | 82 |
| Example 2 | 47 | 79 |
| Example 3 | 45 | 80 |
| Example 4 | 44 | 83 |
| Comparative Example 1 | 33 | 75 |
| Comparative Example 2 | 38 | 76 |
| Comparative Example 3 | 30 | 80 |
| Comparative Example 4 | 30 | 76 |
| Comparative Example 5 | 38 | 75 |
| Comparative Example 6 | 28 | 78 |
| Comparative Example 7 | 25 | 75 |
| Comparative Example 8 | 13 | 50 |

While the invention has been described in detail and with reference to specific embodiments thereof, it will be apparent to one skilled in the art that various changes and modifications can be made therein without departing from the spirit and scope thereof.

This application is based on a Japanese patent application filed on Aug. 19, 2008 (Application No. 2008-210938), the contents thereof being incorporated herein by reference.

INDUSTRIAL APPLICABILITY

The β-type zeolite of the invention has high heat resistance and a large acid amount and, hence, the SCR catalyst employing the zeolite also has excellent hydrothermal durability and has excellent NOx-reducing properties especially at low temperatures. This catalyst has high performance when used as a catalyst for removing NOx contained in the exhaust gases discharged from motor vehicles. Consequently, the invention has a significant industrial value.

DESCRIPTION OF THE REFERENCE NUMERALS

1: Before hydrothermal durability treatment
2: After hydrothermal durability treatment

The invention claimed is:

1. β-Type zeolite which has an SiO$_2$/Al$_2$O$_3$ molar ratio of 20 or higher but less than 30 and a crystallite diameter before a hydrothermal durability treatment of 20 nm or larger, shows a change in crystallite diameter through the hydrothermal durability treatment of less than 10%, and has a fluorine content of 0.1% by weight or lower, wherein
the hydrothermal durability treatment consists of exposure to a 700° C. stream of air containing 10% by volume water vapor for 20 hrs.

2. The β-type zeolite as claimed in claim 1, characterized in that the framework SiO$_2$/Al$_2$O$_3$ molar ratio before the hydrothermal durability treatment (n) as determined by $^{29}$Si MAS NMR is 20 or higher but less than 30, and the framework SiO$_2$/Al$_2$O$_3$ molar ratio after the hydrothermal durability treatment (n') is not higher by more than 10 than that molar ratio as determined before the hydrothermal durability treatment (n'≤n+10).

3. The β-type zeolite as claimed in claim 1 which has an average particle diameter of 0.35-0.50 μm in an examination with an electron microscope.

4. A process for producing the β-type zeolite as described in claim 1, the process comprising crystallizing the zeolite from a liquid reaction mixture containing (1) a secondary and/or a tertiary alkylamine having 5 or more carbon atoms, a tertiary alkylamine having 5 or more carbon atoms or both of them, and (2) a structure-directing agent having a tetraethylammonium cation.

5. An SCR catalyst which comprises the β-type zeolite as described in claim 1, the zeolite containing at least one metal selected from the elements in Groups 8 to 11 of the periodic table.

6. The SCR catalyst as claimed in claim 5 wherein the at least one metal selected from the elements in Groups 8 to 11 of the periodic table comprises iron, copper, or both of them.

7. The SCR catalyst as claimed in claim 5, characterized in that the catalyst contains iron as a metal and that the framework SiO$_2$/Al$_2$O$_3$ molar ratio before a hydrothermal durability treatment (m) as determined by $^{29}$Si MAS NMR is 15-25 and the framework SiO$_2$/Al$_2$O$_3$ molar ratio after the hydrothermal durability treatment (m') is higher by more than 10 than that molar ratio as determined before the hydrothermal durability treatment (m'>m+10).

8. The SCR catalyst as claimed in claim 7 which contains iron as a metal and in which the framework SiO$_2$/Al$_2$O$_3$ molar ratio before the hydrothermal durability treatment (m) as determined by $^{29}$Si MAS NMR is 15-25 and the framework SiO$_2$/Al$_2$O$_3$ molar ratio after the hydrothermal durability treatment (m') is higher than 30 but not higher than 50.

9. The SCR catalyst as claimed in claim 5, which contains Fe as the metal and which has an NOx reduction percentage of 40% or higher at 200° C. after the hydrothermal durability treatment.

10. The β-Type zeolite as claimed in claim 1, which has a crystallite diameter before the hydrothermal durability treatment of 20 to 25.1 nm.

* * * * *